US012651169B2

(12) United States Patent
Sengupta et al.

(10) Patent No.: US 12,651,169 B2
(45) Date of Patent: Jun. 9, 2026

(54) SYSTEM AND METHOD FOR TRAINING AND REFINING MACHINE LEARNING MODELS FOR INTENT CLASSIFICATION

(71) Applicant: Accenture Global Solutions Limited, Dublin (IE)

(72) Inventors: Shubhashis Sengupta, Bangalore (IN); Roshni Ramesh Ramnani, Bangalore (IN); Sakshi Jain, Bangalore (IN); Prerna Prem, Nashik (IN); Asif Ekbal, Patna (IN); Zishan Ahmad, Patna (IN)

(73) Assignee: Accenture Global Solutions Limited, Dublin (IE)

( * ) Notice: Subject to any disclaimer, the term of this patent is extended or adjusted under 35 U.S.C. 154(b) by 943 days.

(21) Appl. No.: 17/837,624

(22) Filed: Jun. 10, 2022

(65) Prior Publication Data

US 2023/0072171 A1     Mar. 9, 2023

(30) Foreign Application Priority Data

Aug. 30, 2021     (IN) .............................. 202141039131

(51) Int. Cl.
G06N 3/044 (2023.01)
G06F 18/2113 (2023.01)
(Continued)

(52) U.S. Cl.
CPC ......... G06N 3/086 (2013.01); G06F 18/2113 (2023.01); G06F 18/2155 (2023.01); G06F 18/2431 (2023.01)

(58) Field of Classification Search
CPC ........ G06N 3/086; G06N 3/006; G06N 5/022; G06N 3/0442; G06N 3/045; G06N 3/0475;
(Continued)

(56) References Cited

U.S. PATENT DOCUMENTS 10,656,475 B2 * 5/2020 Yao .................. G02F 1/133753
2019/0065576 A1 * 2/2019 Peng ..................... G06F 16/285
(Continued)

FOREIGN PATENT DOCUMENTS

WO     2021138020 A1     7/2021

OTHER PUBLICATIONS

Lin et al. 2019. Deep unknown intent detection with margin loss; arXiv preprint; arXiv:1906.00434.
(Continued)

*Primary Examiner* — Brandon S Cole
(74) *Attorney, Agent, or Firm* — Seed Intellectual Property Law Group LLP

(57)     ABSTRACT

A system and method for training and refining a machine learning model is disclosed. The disclosed system and method can further improve the accuracy of trained machine learning models by calculating which threshold values for predictions (e.g., probabilities output by the machine learning model) provide the most accurate results. The system and method may include applying an optimization technique (e.g., multi-objective optimization) to calculate which threshold values result in the best combination of precision and recall. In other words, the system and method adjust threshold values for prediction scores to optimize the objects of precision and recall. A machine learning model trained with these adjusted threshold values can determine when an input belongs to an unknown class because the unknown input has prediction scores below the threshold values for every known class. Embodiments may include refining an intent classifier to better classify unknown intents.

17 Claims, 7 Drawing Sheets

(51) Int. Cl.
    *G06F 18/214*     (2023.01)
    *G06F 18/2431*    (2023.01)
    *G06N 3/086*     (2023.01)
(58) Field of Classification Search
    CPC ............. G06F 18/2113; G06F 18/2155; G06F
           18/2431; G10L 15/063; G10L 15/16;
                       G10L 15/22
    See application file for complete search history.

(56) References Cited

U.S. PATENT DOCUMENTS

2020/0151613 A1   5/2020   Yoo et al.
2021/0118559 A1*   4/2021   Lefkofsky .............. G16B 20/00
2021/0134387 A1*   5/2021   McMaster-Schraiber ...................
                                   G06N 3/045
2021/0189499 A1*   6/2021   Deng ................... G01N 33/492
2022/0270594 A1*   8/2022   Sejpal .................... G06N 3/045

OTHER PUBLICATIONS

Lei Shu, Hu Xu, and Bing Liu. 2017. DOC: Deep open classification of text documents; arXiv preprint; arXiv:1709.08716.
Kalyanmoy Deb, Amrit Pratap, Sameer Agarwal, and TAMT Meyarivan. 2002. A fast and elitist multiobjective genetic algorithm: NSGA-II. IEEE transactions on evolutionary computation, 6(2):182-197.
Dan Hendrycks and Kevin Gimpel. 2016. A baseline for detecting misclassified and out-of-distribution examples in neural networks; arXiv preprint; arXiv:1610.02136.
Hanlei Zhang, Hua Xu, and Ting-En Lin. 2020. Deep open intent classification with adaptive decision boundary; arXiv preprint; arXiv:2012.10209.
Abhijit Bendale and Terrance E Boult. 2016. Towards open set deep networks. In Proceedings of the IEEE conference on computer vision and pattern recognition, pp. 1563-1572.
Asif Ekbal, "Joint model for feature selection and parameter optimization coupled with classifier ensemble in chemical mention recognition", Department of Computer Science and Engineering, Indian Institute of Technology Patna, India, vol. 85, Sep. 2015, pp. 37-51Publication date : Apr. 25, 2015. Available at <<https://doi.org/10.1016/j.knosys.2015.04.015>>.
First Examination Report, Indian App. No. 202244046096 dated Oct. 30, 2023, 6 pages.

* cited by examiner

400

404

412 — PROCESSOR

414 — MEMORY

416 — TRAINING MODULE

418 — OPTIMIZATION MODULE

406

NETWORK

402

408

410

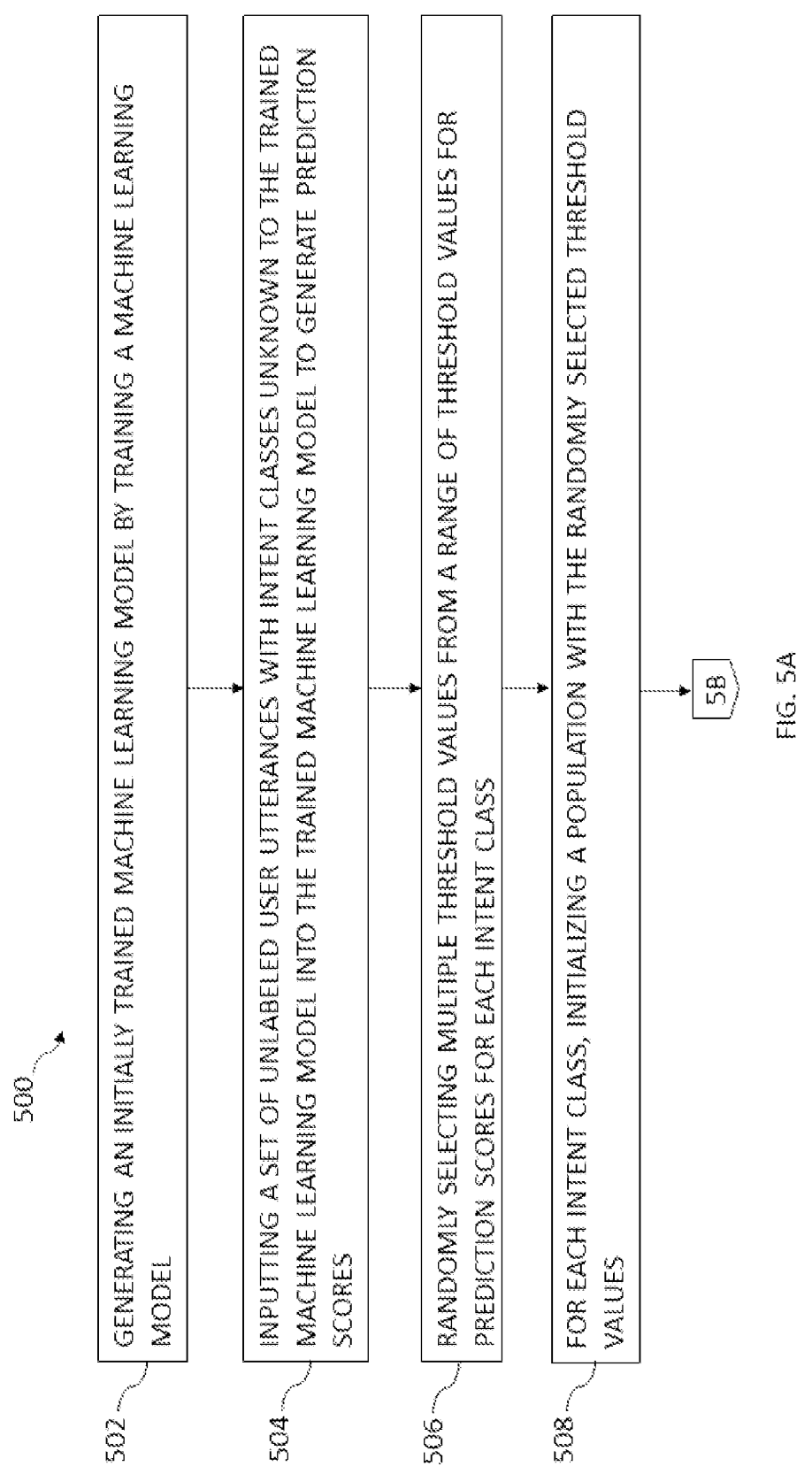

500

502  GENERATING AN INITIALLY TRAINED MACHINE LEARNING MODEL BY TRAINING A MACHINE LEARNING MODEL

504  INPUTTING A SET OF UNLABELED USER UTTERANCES WITH INTENT CLASSES UNKNOWN TO THE TRAINED MACHINE LEARNING MODEL INTO THE TRAINED MACHINE LEARNING MODEL TO GENERATE PREDICTION SCORES

506  RANDOMLY SELECTING MULTIPLE THRESHOLD VALUES FROM A RANGE OF THRESHOLD VALUES FOR PREDICTION SCORES FOR EACH INTENT CLASS

508  FOR EACH INTENT CLASS, INITIALIZING A POPULATION WITH THE RANDOMLY SELECTED THRESHOLD VALUES

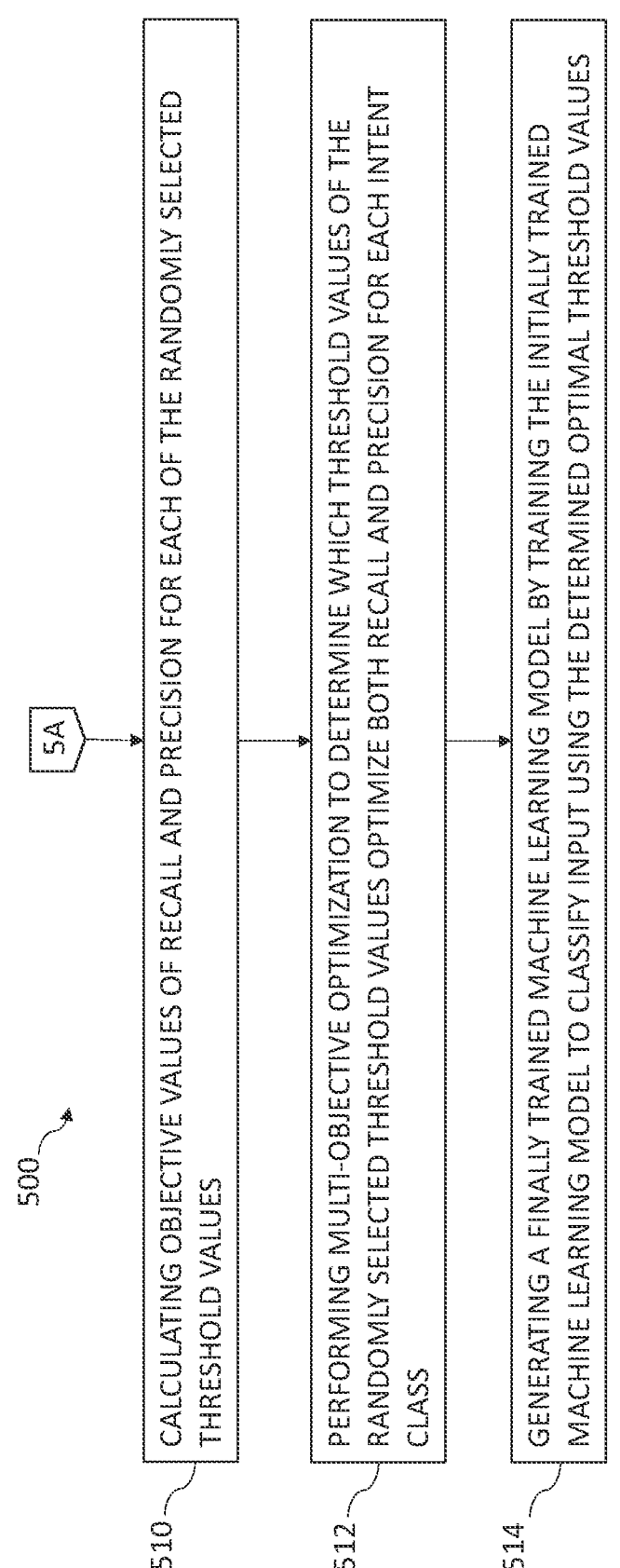

500

5A

510 CALCULATING OBJECTIVE VALUES OF RECALL AND PRECISION FOR EACH OF THE RANDOMLY SELECTED THRESHOLD VALUES

512 PERFORMING MULTI-OBJECTIVE OPTIMIZATION TO DETERMINE WHICH THRESHOLD VALUES OPTIMIZE BOTH RECALL AND PRECISION FOR EACH INTENT CLASS

514 GENERATING A FINALLY TRAINED MACHINE LEARNING MODEL BY TRAINING THE INITIALLY TRAINED MACHINE LEARNING MODEL TO CLASSIFY INPUT USING THE DETERMINED OPTIMAL THRESHOLD VALUES

FIG. 5B

SYSTEM AND METHOD FOR TRAINING AND REFINING MACHINE LEARNING MODELS FOR INTENT CLASSIFICATION

CROSS-REFERENCE TO RELATED APPLICATION(S)

This application claims priority to Indian Provisional Patent Application 202141039131, entitled "SYSTEM AND METHOD FOR UNKNOWN INTENT DETECTION USING MULTI-OBJECTIVE OPTIMIZATION ON DEEP LEARNING CLASSIFIERS", filed on Aug. 30, 2021 (IN 202141039131), the entirety of which is hereby incorporated by reference.

TECHNICAL FIELD

The present disclosure generally relates to training and refining machine learning models. More specifically, the present disclosure generally relates to training a machine learning model and applying multi-objective optimization to refine the trained machine learning model.

BACKGROUND

Natural language understanding systems interpret the word sequences of user utterances. For example, natural language understanding systems are used by task-oriented virtual agents. Virtual agents are computer-generated agents that can interact with users. Goal- or task-oriented virtual agents may communicate with human users in a natural language and work with or help the users in performing various tasks. The tasks performed by a virtual agent can vary in type and complexity. Exemplary tasks include information retrieval, rule-based recommendations, as well as navigating and executing complex workflows. Informally, virtual agents may be referred to as "chatbots." Virtual agents may be used by corporations to assist customers with tasks such as booking reservations and working through diagnostic issues (e.g., for solving an issue with a computer). Using virtual agents may offer a corporation advantages by reducing operational costs of running call centers and improving the flexibility with which a company can increase the number of available agents that can assist customers.

Natural language understanding systems help virtual agents identify what the human user desires. For example, the natural language understanding system may have an intent model that finds the user's intent from the user's utterances. Then, a downstream component of the virtual agent, such as a dialogue manager, can use the intent to identify how to respond to the human user.

Machine learning models designed to identify intent from user utterances typically cannot provide results for unknown intents. For example, in many machine learning models designed to identify intent, the models are trained using a dataset that has known classes of intents. These models may perform well for identifying known intents (i.e., intents included in training data). However, real world data may contain intents the training data does not include. Accordingly, these models do not perform well at identifying these unknown intents.

There is a need in the art for a system and method that addresses the shortcomings discussed above.

SUMMARY

A system and method for training and refining a machine learning model is disclosed. Precision and recall are indicators of a machine learning model's performance. Precision and recall are often in tension. Improving precision may reduce recall, and improving recall may reduce precision. Thus, tuning a machine learning model can be complicated, as one improvement can undo another. The disclosed system and method overcome this issue by applying an optimization technique (e.g., multi-objective optimization) to optimize precision and recall to find optimal threshold values for prediction values. While the disclosed system and method is discussed with the example of a classification neural network, it is understood that the disclosed system and method can be applied to any type of machine learning model.

To demonstrate how the disclosed system and method can improve a machine learning model, the disclosure describes an embodiment of a classification model trained to determine user intent, and how the disclosed system and method may refine the model to identify user intent that is unknown. Classification models trained using datasets having known classes of intents perform well for identifying known intents, but do not perform as well for identifying unknown intents. The disclosed system and method refine the classification models to identify unknown user intents by applying an optimization technique to optimize precision and recall.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method of training and refining a machine learning model. The computer-implemented method also includes generating an initially trained machine learning model by training a machine learning model with a labeled dataset including labels defining which classes apply to each piece of data. The method also includes inputting an unlabeled dataset with unknown classes into the initially trained machine learning model to generate prediction scores representing the probability that each piece of data belongs in each known class, respectively. The method also includes randomly selecting multiple threshold values from a range of threshold values for prediction scores for each known class. The method also includes for each known class, initializing a population with the randomly selected threshold values. The method also includes calculating objective values of recall and precision for each of the randomly selected threshold values. The method also includes performing multi-objective optimization to determine which threshold values of the randomly selected threshold values optimize both recall and precision for each known class. The method also includes generating a finally trained machine learning model by training the initially trained machine learning model to classify input using the determined optimal threshold values. Other embodiments of this aspect include corresponding computer systems, apparatus, and computer programs recorded on one or more computer storage devices, each configured to perform the actions of the methods.

Implementations may include one or more of the following features. The method where performing multi-objective optimization may include performing non-dominated sorting genetic algorithm II (NSGA-II) to determine which threshold values of the randomly selected threshold values optimize both recall and precision for each class the initially trained machine learning model is trained for. Performing multi-objective optimization may include sorting the initialized population into fronts ranked by ascending level of non-domination, where the fronts each contain members including threshold values of the randomly selected threshold values. Performing multi-objective optimization may include, for each front, calculating a crowding distance for each member of the respective front. Performing multi-objective optimization may include generating an offspring population by applying crowded tournament selection to the members of the fronts. Crowded tournament selection includes comparing the rank between two members and, if one member has a higher rank than the other member, selecting the member with the higher rank, and, if two members have the same rank, selecting the member with the highest crowding distance. Generating the offspring population includes applying crossover and mutation operators to the initialized population. The initially trained machine learning model is an intent classification deep neural network. Implementations of the described techniques may include hardware, a method or process, or computer software on a computer-accessible medium.

One general aspect includes a non-transitory computer-readable medium storing software may include instructions executable by one or more computers which. The non-transitory computer-readable medium storing software also includes generating an initially trained machine learning model by training a machine learning model with a labeled dataset including labels defining which classes apply to each piece of data. The software also includes inputting an unlabeled dataset with unknown classes into the initially trained machine learning model to generate prediction scores representing the probability that each piece of data belongs in each known class, respectively. The software also includes randomly selecting multiple threshold values from a range of threshold values for prediction scores for each known class. The software also includes for each known class, initializing a population with the randomly selected threshold values. The software also includes calculating objective values of recall and precision for each of the randomly selected threshold values. The software also includes performing multi-objective optimization to determine which threshold values of the randomly selected threshold values optimize both recall and precision for each known class. The software also includes generating a finally trained machine learning model by training the initially trained machine learning model to classify input using the determined optimal threshold values. Other embodiments of this aspect include corresponding computer systems, apparatus, and computer programs recorded on one or more computer storage devices, each configured to perform the actions of the methods.

Implementations may include one or more of the following features. The non-transitory computer-readable medium storing software performing multi-objective optimization may include performing non-dominated sorting genetic algorithm II (NSGA-II) to determine which threshold values of the randomly selected threshold values optimize both recall and precision for each class the initially trained machine learning model is trained for. Performing multi-objective optimization may include sorting the initialized population into fronts ranked by ascending level of non-domination, where the fronts each contain members including threshold values of the randomly selected threshold values. Performing multi-objective optimization may include, for each front, calculating a crowding distance for each member of the respective front. Performing multi-objective optimization may include generating an offspring population by applying crowded tournament selection to the members of the fronts. Crowded tournament selection includes comparing the rank between two members and, if one member has a higher rank than the other member, selecting the member with the higher rank, and, if two members have the same rank, selecting the member with the highest crowding distance. Generating the offspring population includes applying crossover and mutation operators to the initialized population. The initially trained machine learning model is an intent classification deep neural network. Implementations of the described techniques may include hardware, a method or process, or computer software on a computer-accessible medium.

One general aspect includes a system for training and refining a machine learning model. The system also includes a device processor. The system also includes a non-transitory computer readable medium storing instructions that are executable by the device processor to: generate an initially trained machine learning model by training a machine learning model with a labeled dataset including labels defining which classes apply to each piece of data; input an unlabeled dataset with unknown classes into the initially trained machine learning model to generate prediction scores representing the probability that each piece of data belongs in each known class, respectively; randomly select multiple threshold values from a range of threshold values for prediction scores for each known class; for each known class, initialize a population with the randomly selected threshold values; calculate objective values of recall and precision for each of the randomly selected threshold values; perform multi-objective optimization to determine which threshold values of the randomly selected threshold values optimize both recall and precision for each known class; and generate a finally trained machine learning model by training the initially trained machine learning model to classify input using the determined optimal threshold values. Other embodiments of this aspect include corresponding computer systems, apparatus, and computer programs recorded on one or more computer storage devices, each configured to perform the actions of the methods.

Implementations may include one or more of the following features. The system performing multi-objective optimization may include performing non-dominated sorting genetic algorithm II (NSGA-II) to determine which threshold values of the randomly selected threshold values optimize both recall and precision for each class the initially trained machine learning model is trained for. Performing multi-objective optimization may include sorting the initialized population into fronts ranked by ascending level of non-domination, where the fronts each contain members including threshold values of the randomly selected threshold values. The initially trained machine learning model is an intent classification deep neural network. Implementations of the described techniques may include hardware, a method or process, or computer software on a computer-accessible medium.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIGS. 5A and 5B show a method of training and refining a machine learning model, according to an embodiment.

DESCRIPTION OF EMBODIMENTS

The disclosed system and method include training and refining (or fine tuning) a machine learning model by applying an optimization technique to optimize precision and recall by adjusting threshold values to calculate optimal threshold values for application to prediction scores. In the exemplary embodiments described, the machine learning model is a user intent classifier that uses deep learning. However, it is understood that other embodiments include other types of classifiers or even other types of machine learning models. For example, the disclosed system and method may include training and refining an image processing neural network (e.g., convolutional neural network) or a speech recognition neural network (e.g., feed forward network). The disclosed system and method can further improve the accuracy of trained machine learning models by calculating which threshold values for predictions (e.g., probabilities output by the machine learning model) provide the most accurate results. The system and method may include applying an optimization technique (e.g., multi-objective optimization) to calculate which threshold values result in the best combination of precision and recall. In other words, the system and method adjust threshold values for prediction scores to optimize the objects of precision and recall.

Figure 1:
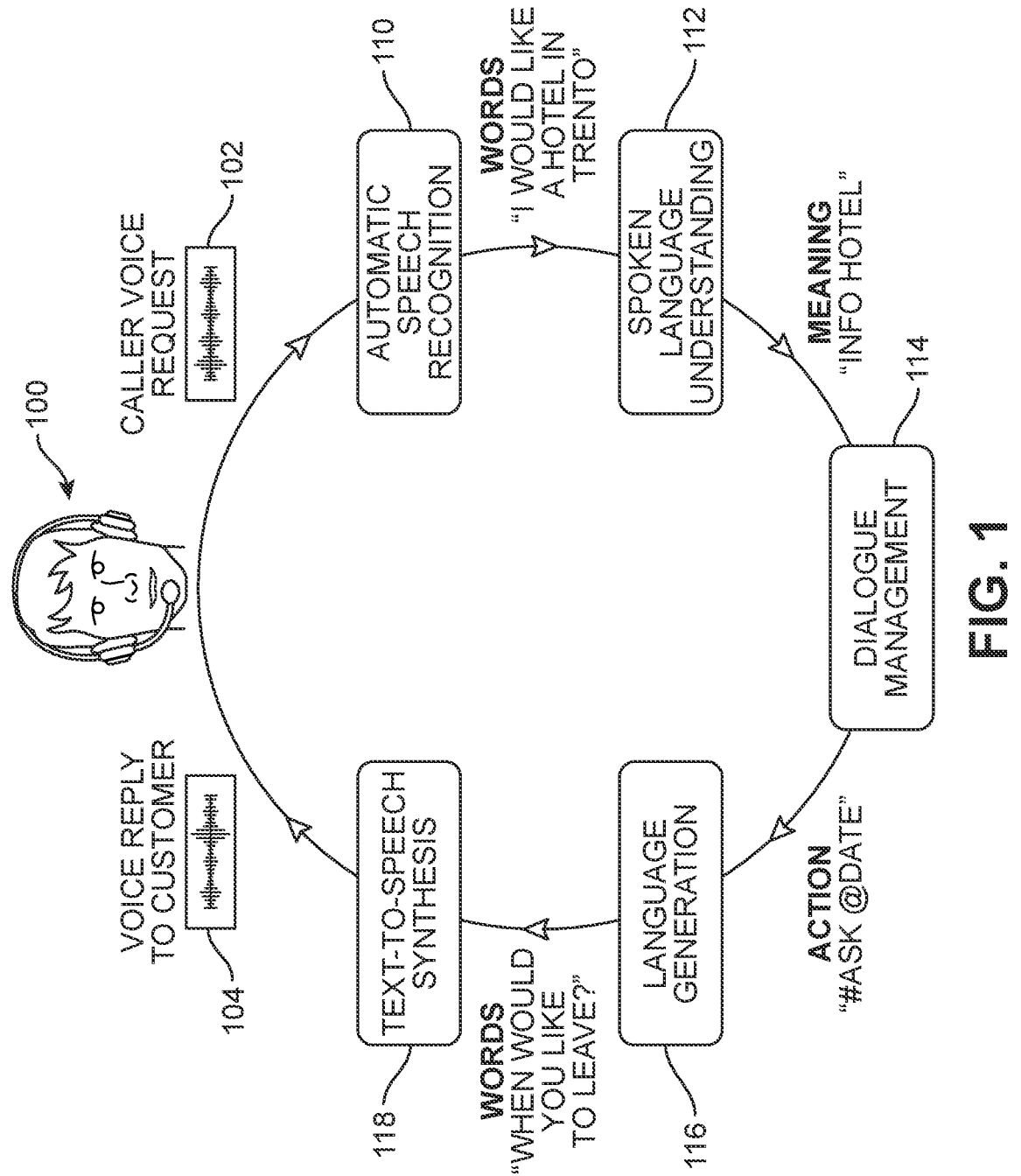
FIG. 1 is a schematic diagram of an embodiment of a virtual agent that corresponds with a customer.

To demonstrate how the disclosed system and method may be incorporated into applications, an embodiment in which the disclosed system and method is incorporated in a natural language understanding system, or a spoken language understanding system is provided. In some embodiments, the natural language understanding system comprises a sub-system of a virtual agent. The virtual agent takes in requests from a customer (or other end user) and processes the requests before responding back to the customer. To process requests from a customer and respond appropriately, the virtual agent may include multiple subsystems or modules that help solve various subtasks (e.g., voice recognition). For example, FIG. 1 shows an exemplary virtual agent 100 including a series of processes that occur between a request 102 (e.g., "caller voice request") and a response 104 (e.g., "voice reply to customer"). While the exemplary embodiment depicts a conversation that occurs as a phone call between virtual agent 100 and a customer, in other embodiments a virtual agent could communicate with a customer through other means including text-based communication (e.g., SMS or a chat-based application) and/or video communication (e.g., using Skype or Facetime).

Following the exemplary process characterized in FIG. 1, request 102 is first processed by an automatic speech recognition system 110. The goal of speech recognition system 110 is to convert spoken words into a string, or sequence, of words that can be used by systems downstream of speech recognition system 110. For example, speech recognition system 110 may convert a received audio signal (the customer's request over the phone) into the string, or sequence, of words "I would like a hotel in Trento." This sequence of words is then passed to a natural language understanding system 112.

The goal of natural language understanding system 112 is to extract the meaning of the string of words passed on from speech recognition system 110. For example, natural language understanding system 112 may analyze the phrase "I would like a hotel in Trento" and determine that the customer is looking for information about a hotel. More specifically, in some embodiments, the natural language understanding system takes in a word sequence as input and outputs (1) the dialogue act category (e.g., question, command, or information) of the word sequence, (2) the intent of the user, and (3) slot names and values. The intent corresponds to the topic of the word sequence (e.g., "flights", "hotels", "restaurants," etc.). Slots correspond to goal-relevant pieces of information. The slot name refers to a type or category of information that may be domain specific, such as "location" or "check-in date" in the context of booking a hotel. The slot values correspond to the particular choice for the slot name, such as "Trento" for the slot name "location."

The outputs of natural language understanding system 112, which provide the extracted meaning of a word sequence, may be passed to dialogue management system 114. In the example shown in FIG. 1, the extracted information "info hotel" is provided to dialogue management system 114. However, it may be appreciated that in some cases the passed information could include the category, intent, and list of slot names/values corresponding to the original word sequence.

The goal of dialogue management system 114 is to track the current state of the dialogue between virtual agent 100 and the customer and to respond to the request in a conversational manner. Dialogue management system 114 generates an action based on the information received from natural language understanding system 112, as well as the state of the dialogue with the customer.

The action immediately output by dialogue management system 114 may be symbolic in nature (e.g., "#ask @date"). This symbolic output is then converted into a natural language response by a language generation system 116. For example, language generation system 116 may receive input from dialogue management system 114 (e.g., "#ask @date") and output a string of words (e.g., "when would you like to leave?"). These words may then be converted into an audible response 104 by text-to-speech synthesis unit 118. It may be appreciated that this cycle represented by FIG. 1 may be repeated after each customer request (or other utterance) such that virtual agent 100 provides a response and continues a conversation with the customer until the customer goals have been met.

Figure 2:
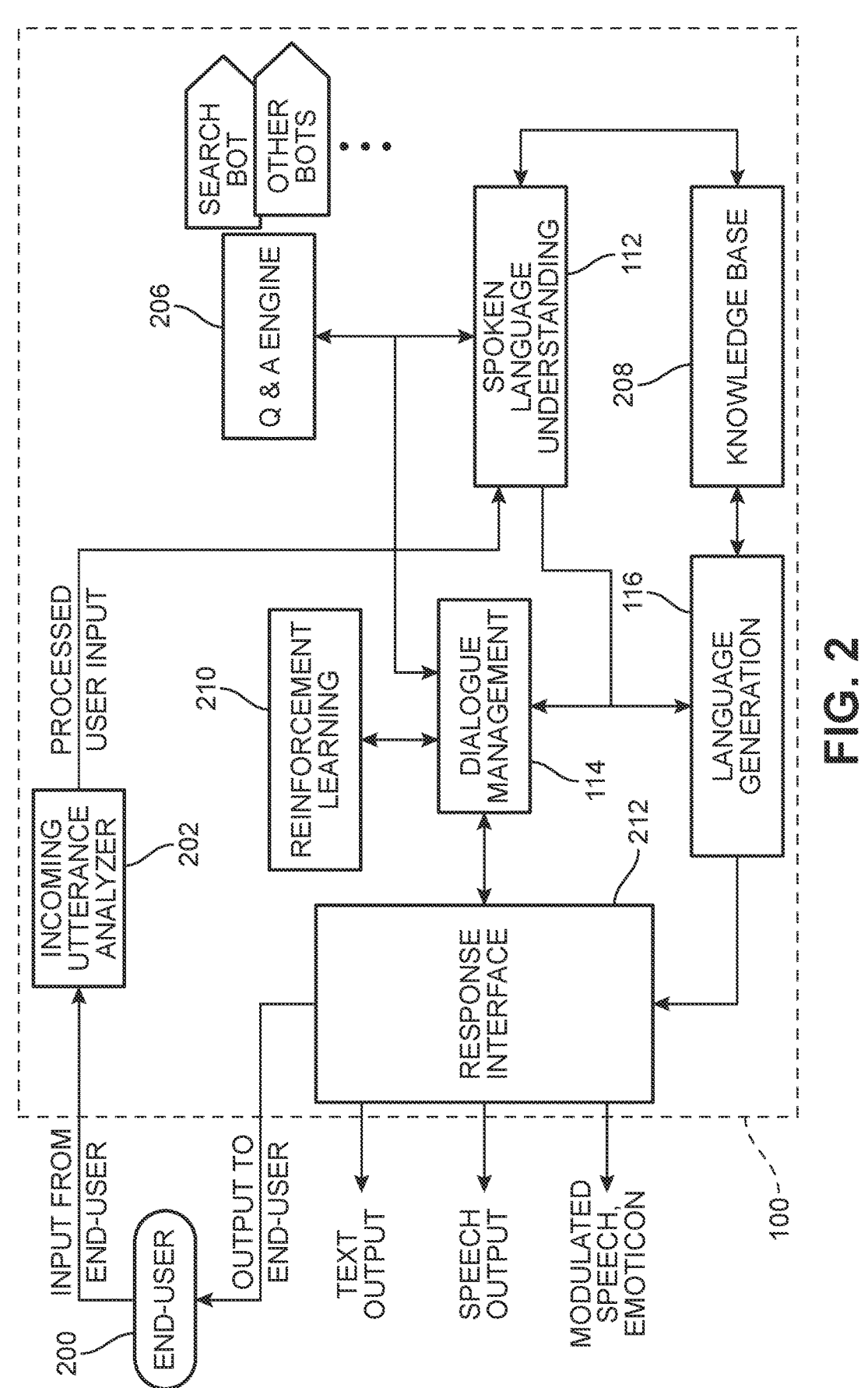
FIG. 2 is a schematic diagram of an embodiment of an architecture of a virtual agent.

A virtual agent may include additional subsystems and modules to achieve the goal of conversing with a customer and achieving the customer goals. For example, FIG. 2 is a schematic view of an embodiment of an architecture for virtual agent 100. Referring to FIG. 2, an end user 200 communicates with virtual agent 100. Communication may occur through various modes, including text-based chat programs that may run on a desktop, laptop or mobile device, telephone calls, audio and/or video calls transmitted over the internet (e.g., through services such as Skype) as well as other known modes of communication.

Input from end user 200 may be received and processed by an incoming utterance analyzer 202. In some cases, incoming utterance analyzer 202 may identify the type of input (e.g., audio, text, gestures, etc.) and direct the input to the proper sub-module (such as an automatic speech recognition module for audio input or a gesture interpreter for gesture-based inputs). The processed user input, which may take the form of strings of words, can then be passed to natural language understanding system 112 to extract meaning from the end-user input.

Natural language understanding system 112 may further communicate with dialogue management system 114. In some cases, natural language understanding system 112 may also directly communicate with language generation system 116. Language generation system 116 can include modules to facilitate converting symbolic (or otherwise coded) output into a natural language format. Such modules could include a randomized machine utterance generator and a narrative generator. In some cases, natural language utterances may be generated using a Sequence Generative Adversarial Net (seqGAN).

A virtual agent can include provisions for gathering information. For example, in FIG. 2, natural language understanding system 112 and/or dialogue management system 114 may communicate with a Q&A ("Question & Answer") Engine 206. Q&A Engine 206 can include sub-modules for identifying a question and determining if the question has been previously stored (or indexed) or if it is a new question. Q&A Engine 206 can also include provisions for searching for information on the web or in other systems accessible by virtual agent 100. For example, to look up the answer to a particular question, Q&A Engine 206 may use a search bot and/or other kinds of bots. In some cases, Q&A Engine 206 may access external services through an application protocol interface (API).

A virtual agent can include provisions for storing various kinds of information. For example, virtual agent 100 can include a knowledge base system 208. Knowledge base system 208 could include databases for storing a training collection, user and state info, and various kinds of domain specific knowledge (e.g., in the form of a graph).

A virtual agent can include provisions for learning to converse with an end user in a natural manner. For example, virtual agent 100 may include a reinforcement learning module 210. In the example of FIG. 2, dialogue management system 114, which may be trained using reinforcement learning processes as described above, can communicate directly with reinforcement learning module 210. In some cases, reinforcement learning module 210 may only be accessed during training sessions. In other cases, reinforcement learning module 210 may be accessed while virtual agent 100 is engaged with an end user, including a real customer. It may be appreciated that in some cases, other systems of virtual agent 100 could also communicate with, and utilize the resources of, reinforcement learning module 210.

Output to a user is provided at a response interface system 212. Response interface system 212 may communicate with dialogue management system 114 and/or language generation system 116. Information received from either of these units can be converted into a final output intended for end user 200. Response interface system 212 may therefore be capable of converting inputs from other systems into text, speech, and/or other kinds of expressions (such as modulated speech, emoticons, etc.).

Figure 3:
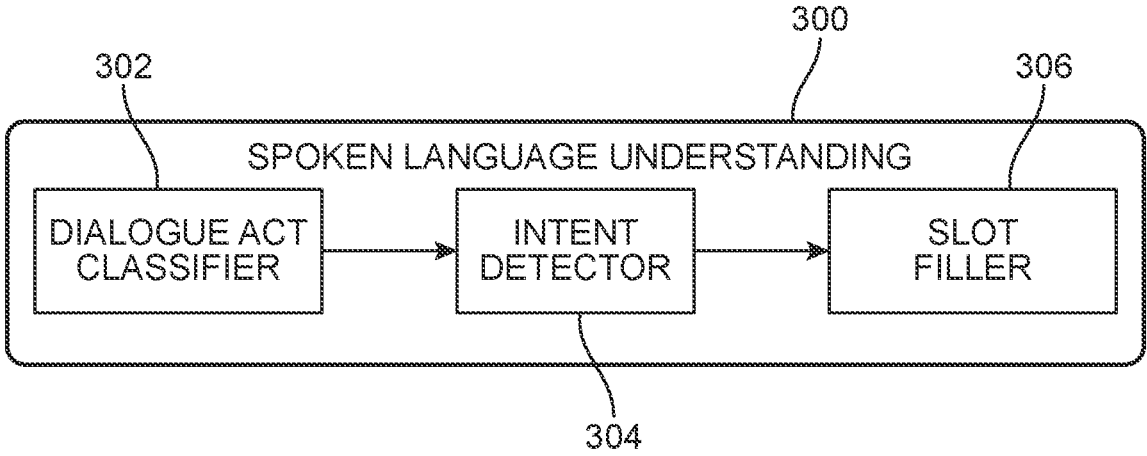
FIG. 3 is a schematic diagram of an embodiment of a natural language understanding system.

This disclosure focuses on an intent classifier. To illustrate how an intent classifier could be used with a natural language understanding system of a virtual agent (or conversation system), FIG. 3 shows a schematic diagram of an embodiment of a natural language understanding system 300. The natural language understanding system includes three main components: a dialogue act classifier, an intent classifier, and a slot filler. For example, natural language understanding system 300 includes a dialogue act classifier 302, an intent classifier 304, and a slot filler 306. The dialogue act classifier classifies a word sequence into a dialogue act category. Rather than focus on the specific topic of the word sequence, the dialogue act category defines the type of communication indicated by the word sequence. Examples of dialogue act categories include question, greeting, command, and information. In one example, if a user says, "I want to fly from Seattle to Chicago," then the category is "command." In another example, if a user says, "I want to eat Chinese food that is medium-priced and from restaurants that are in the eastern part of the city," then the category is "command." In yet another example, if the user asks, "what is the weather like today?", then the category is "question." In yet another example, if the user says, "hello", then the category is greeting.

The slot filler extracts constituents from the word sequence. In other words, the slot filler finds goal-relevant pieces of information in the word sequence to determine which slot information, including slot names and slot values apply to the situation. For example, if a user says, "I want to fly from Seattle to Chicago," then the slots for this string of words could be "From-City" and "To_City." The value for the "From-City" slot is "Seattle" and the value for "To_City"

is "Chicago." In another example, if a user says, "I want to eat Chinese food that is medium-priced and from restaurants that are in the eastern part of the city," the slots for this string of words could be "food", "price", and "area". The value for "food" is "Chinese". The value for "price" is "medium". The value for "area" is "Eastern".

As understood from above, the intent classifier identifies the user's intent. The intent classifier focuses on the specific topic of the word sequence to determine what it is the user desires. Examples of intents include flight, ground transportation, restaurant, and computer fault diagnosis. In one example, if a user says, "I want to fly from Seattle to Chicago," then the intent is "flight." In another example, if a user says, "I can't log into my email," then the intent is "logging in." It is understood that the intent classifier may be used by itself or in conjunction with the dialogue act classifier and/or slot filler.

Figure 4:
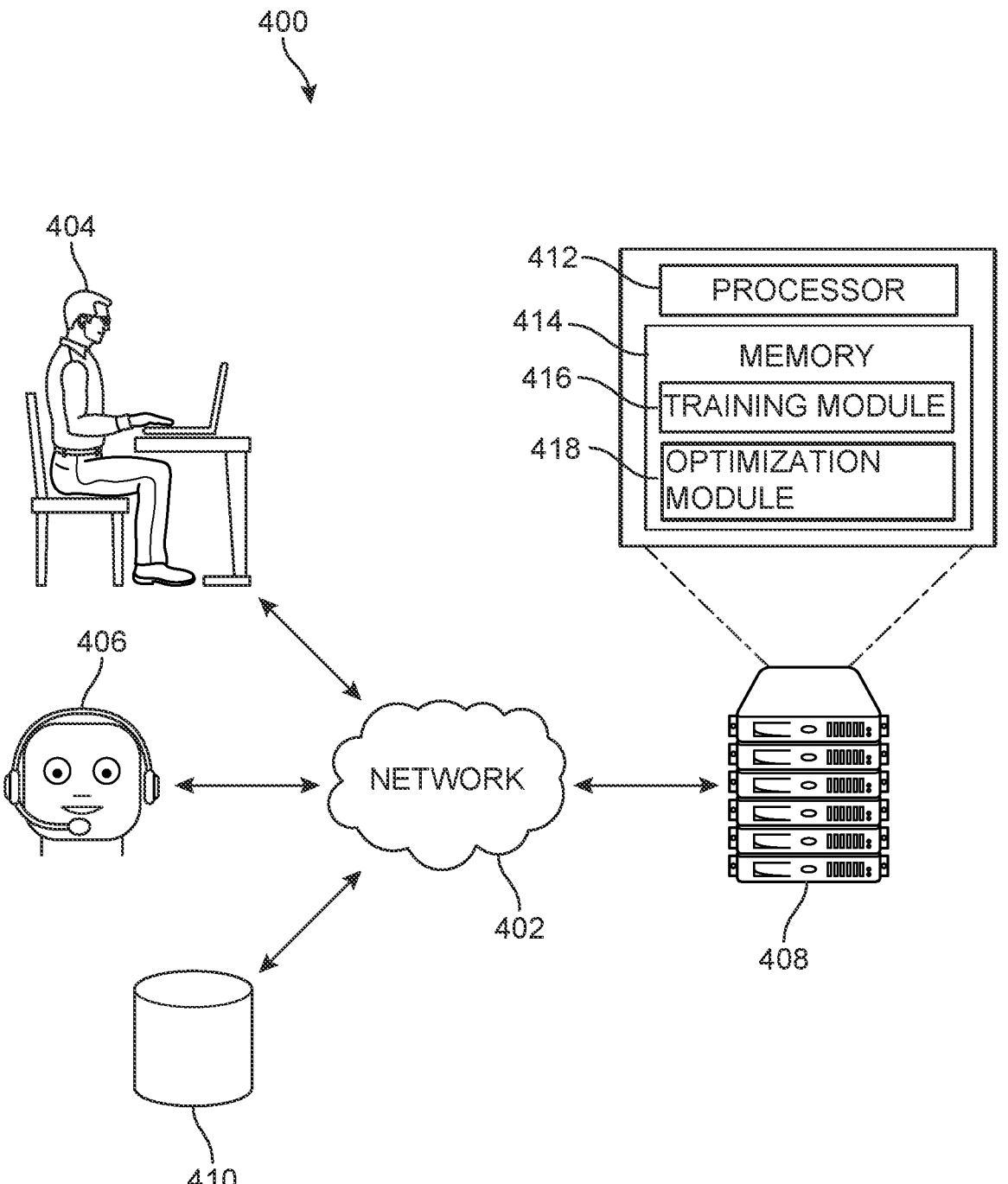
FIG. 4 is a schematic diagram of a system for training and refining a machine learning model, according to an embodiment.

FIG. 4 is a schematic diagram of a system for training and refining a machine learning model 400 (or system 400), according to an embodiment. The disclosed system may include a plurality of components capable of performing the disclosed computer implemented method of training and refining a machine learning model (e.g., method 500). For example, system 400 includes a first user device 404, a virtual agent 406, a computing system 408, a network 402, and a database 410.

The components of system 400 can communicate with each other through network 402. For example, first user device 404 may communicate with virtual agent 406 via network 402. Virtual agent 406 may be a chatbot capable of communicating with first user device 404. For example, virtual agent 406 may conduct a chat with first user device 404 in which virtual agent 406 asks the user for information related to the tasks the user desires. In some embodiments, the virtual agent and associated systems for communicating with a virtual agent may include one or more user devices, such as a computer, a server, a database, and a network. For example, a virtual agent running on a server could communicate with a user over a network. In some embodiments, network 402 may be a wide area network ("WAN"), e.g., the Internet. In other embodiments, network 402 may be a local area network ("LAN"). One or more resources of a virtual agent may be run on one or more servers. Each server may be a single computer, the partial computing resources of a single computer, a plurality of computers communicating with one another, or a network of remote servers (e.g., cloud). The one or more servers can house local databases and/or communicate with one or more external databases.

As shown in FIG. 4, a training module 416 and an optimization module 418 may be hosted in computing system 408, which may have a memory 414 and a processor 412. Processor 412 may include a single device processor located on a single device, or it may include multiple device processors located on one or more physical devices. Memory 414 may include any type of storage, which may be physically located on one physical device, or on multiple physical devices. In some cases, computing system 408 may comprise one or more servers that are used to host training module 416 and optimization module 418. Database 410 may store data that may be retrieved by other components for system 400.

While FIG. 4 shows a single user device, it is understood that more user devices may be used. For example, in some embodiments, the system for training and refining a machine learning model may include two or three user devices. The user may include an individual (e.g., a customer) seeking assistance with planning a trip or with troubleshooting computer issues. The user device may be a computing device used by a user for communicating with a virtual agent. The user device of the virtual agent may be a computing device. In some embodiments, one or more of the user devices (e.g., those of the user or virtual agent) may include a smartphone or a tablet computer. In other embodiments, one or more of the user devices (e.g., those of the user or virtual agent) may include a laptop computer, a desktop computer, and/or another type of computing device. The user devices may be used for inputting, processing, and displaying information. The user device may include a display that provides an interface for the user to input and/or view information. For example, a user could interact with a virtual agent using a program run on a laptop computer, such as a text-based chat program, a voice-based communication program, and/or a video-based communication program. Alternatively, in some cases, the user device could be a telephone (e.g., a landline, cell phone, etc.). The user device of the virtual agent may be the same type as the user device of the individual user. However, the user device of the virtual agent may be a different type from the user device of the individual user, according to some embodiments.

The method may generally include training a machine learning model, such as a deep learning neural network. For example, the method may include training a neural network for intent classification. Post-processing steps may be applied on top of this training to obtain optimal results. The initial machine learning model (e.g., neural network) may be considered a base model. The method does not require model architecture modification of the base model. The method may generally include training the base model on labeled training data (e.g., user utterances labeled with intent classes). For example, training module 416 may perform this operation. After training, an unknown dataset (e.g., user utterances unknown to the trained base model) may be input to the trained base model to calculate prediction scores for each class (e.g., intent class). These prediction scores may be used to determine optimal thresholds for each class. For example, in some embodiments, the prediction scores may be used to calculate which possible thresholds optimize recall and precision for classification. As described in more detail below, optimization module 418 may perform the disclosed operations to calculate which threshold values optimize recall and precision for classification.

FIGS. 5A and 5B shows an embodiment of a method of training and refining a machine learning model 500 (or method 500). In the embodiment of FIGS. 5A and 5B, the machine learning model may be an intent classifier. The method may include generating an initially trained machine learning model by training a machine learning model with a labeled dataset including labels defining which classes apply to each piece of data. For example, method 500 includes generating an initially trained machine learning model by training a machine learning model with training data including user utterances labeled with intent classes to classify intent of user utterances (operation 502).

In some embodiments, the method may include refining an already-trained machine learning model. In such an embodiment, the already-trained machine learning model is the initially trained machine learning model. The method may include inputting an unlabeled dataset with unknown classes into the initially trained machine learning model to generate prediction scores representing the probability that each piece of data belongs in each known class, respectively. For example, method 500 includes inputting a set of unlabeled user utterances with intent classes unknown to the trained machine learning model into the trained machine learning model to generate prediction scores representing the probability that each user utterance belongs in each intent class, respectively (operation 504).

The method may include randomly selecting multiple threshold values from a range of threshold values for prediction scores for each known class. For example, method 500 includes randomly selecting multiple threshold values from a range of threshold values for prediction scores for each intent class (operation 506). The method may include, for each known class, initializing a population with the randomly selected threshold values. For example, method 500 includes, for each intent class, initializing a population with the randomly selected threshold values (operation 508). The method may include calculating objective values of recall and precision for each of the randomly selected threshold values. For example, method 500 includes calculating objective values of recall and precision for each of the randomly selected threshold values (operation 510). The method may include performing an optimization technique to determine which threshold values of the randomly selected threshold values optimize both recall and precision for each known class. For example, method 500 includes performing multi-objective optimization to determine which threshold values of the randomly selected threshold values optimize both recall and precision for each intent class (operation 512). The method may include generating a finally trained machine learning model by training the initially trained machine learning model to classify input using the determined optimal threshold values. For example, method 500 includes generating a finally trained machine learning model by training the initially trained machine learning model to classify input using the determined optimal threshold values (operation 514).

The base models may include any type of machine learning model suitable for using prediction scores to classify input (e.g., the intent of a user utterance or the type of mechanical component shown in an image). In some embodiments, the machine learning model may include a Bi-directional Long Short Term Memory (Bi-LSTM) model. In other embodiments, the machine learning model may include a Bi-directional Encoder Representation from Transformer (BERT) model. These exemplary types of models are discussed in more detail below with respect to how these types of models may be trained (e.g., according to operation 502).

In embodiments including a Bi-LSTM, the method may include training the Bi-LSTM to obtain prediction scores for the classes of input (e.g., the intent classes of user utterances). For example, operation 502 may be performed to achieve this training. The Bi-LSTM may include a forward LSTM and a backward LSTM. Given a user utterance with maximum word sequence length l, the sequence of input words $\omega_{i:l}$ from the utterance can be transformed into m-dimensional word embedding $v_{i:l}$, which is used by the Bi-LSTM to produce feature representations x:

$$\overrightarrow{x}_t = \text{LSTM}(v_t, \overrightarrow{c}_{t-1}) \tag{1}$$

$$\overleftarrow{x}_t = \text{LSTM}(v_t, \overleftarrow{c}_t - 1) \tag{2}$$

$$x = [\overrightarrow{x}_t, \overleftarrow{x}_t] \tag{3}$$

where $v_t$ denotes the word embedding of input at time step t, $\overrightarrow{x}_t$ and $\overleftarrow{x}_t$ are the output vectors of the forward and backward LSTMs of the Bi-LSTM, respectively. $\overrightarrow{c}_{t-1}$ and $\overleftarrow{c}_t - 1$ are the cell state vectors of forward and backward LSTM, respectively. The last output vector of forward LSTM $\overrightarrow{x}_t$ and the first output vector of backward LSTM $\overleftarrow{x}_t$ can be concatenated into x as a sentence representation. This sentence representation can capture high-level semantic concepts learned by the model. The sentence representation x can then be then fed to a neuron feed forward layer n, where n is the number of known classes (e.g., intent classes) in the dataset. The n dimensional representation obtained through the neuron feed forward layer can be converted to probability distribution for each class by using a Softmax function.

In embodiments including a BERT model, the method may include training the BERT model (or alternatively refining a trained BERT model) to obtain prediction scores to classify input (e.g., the intent of a user utterance or the type of mechanical component shown in an image). For example, this function may be similar to operation 502. The prediction scores may include Softmax classification scores of input samples of user utterances. In some embodiments, given $i^{th}$ input sentence $s_i$, a [CLS] token may be appended at the beginning of the input sentence. The token embeddings of the sequence [CLS, T1, . . . , TN]$\in R^{(N+1)*H}$ from the last hidden layer of BERT may be obtained. In this sequence, the [CLS] vector representation may be used for text classification, N is the sequence length, and H is the hidden layer size. The prediction scores may be calculated by applying a Softmax function to the last layer output ($\text{logits}(x_i)$) of the trained BERT model to output probability distributions for each class (e.g., intent class).

Since the models are not trained using a separate class for unknown, the models can be trained on a subset of the classes in a dataset, holding out the rest of the classes in the dataset to be classified as unknown during testing.

In order to reflect the effectiveness of the learned optimal thresholds a cross-entropy loss $L_s$ may be used to train the base models. For example, the following cross-entropy loss may be used:

$$L_s = \frac{-1}{N} \sum_{i=1}^{N} y_i \log(\hat{y}_i) \tag{4}$$

where N is total number of training samples, $y_i$ is true label, and $\hat{y}_i$ is predicted label.

Figure 6:
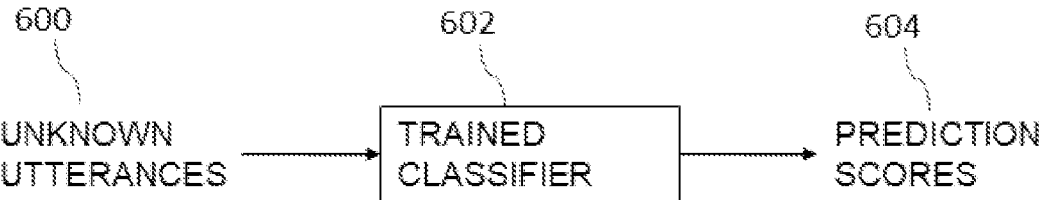
FIG. 6 is a schematic diagram showing how prediction scores may be obtained from a trained machine learning model, according to an embodiment.

After training the machine learning model for each training input, the trained model may be used to obtain the prediction scores (e.g., Softmax scores) of the input samples at the output layer. For example, as discussed above, the method may include inputting an unlabeled dataset with unknown classes into the initially trained machine learning model to generate prediction scores representing the probability that each piece of data belongs in each known class, respectively. As shown in FIG. 6, training data samples 600 may be passed to a trained model (i.e., trained intent classifier 602) to obtain the prediction scores 604 corresponding to each sample. In other words, trained intent classifier 602 may process training data samples 600 to output, at the output layer, a prediction score for each class for which the trained intent classifier has been trained. When calculating these prediction scores, the training data samples may be unknown to the trained classifier. The calculated prediction scores may be used to obtain optimal thresholds for each known class using one or more of the different threshold tuning methods discussed below.

Figure 7:
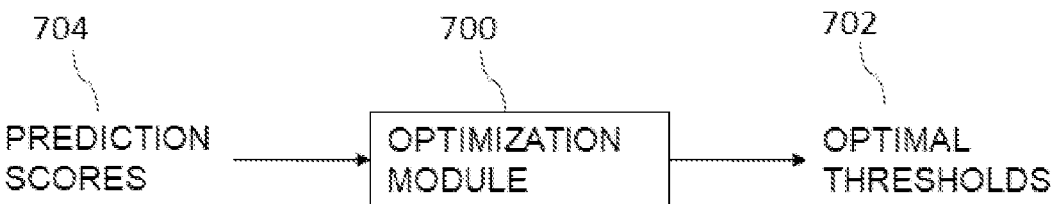
FIG. 7 is a schematic diagram showing how optimal thresholds may be obtained from an optimization module, according to an embodiment.

After getting the prediction scores from the trained model, the optimal threshold for each known class may be calculated. For example, as shown in FIG. 7, prediction scores 604 may be input into optimization module 700 to output optimal thresholds 702 for each respective class. In some embodiments, as described in more detail below, the optimal thresholds may be obtained by multi-objective optimization. In other embodiments, as also described in more detail below, the optimal thresholds may be calculated by applying normal thresholding The method may include calculating precision and recall for the trained model based on these prediction scores output by the trained model (e.g., performing operations 506, 508, and 510). Precision and recall are indicators of a machine learning model's performance. Precision is the number of true positives divided by the total number of positive predictions, as follows, where tp is true positives and fp is false positives:

$$\frac{tp}{tp + fp} \qquad (5)$$

Recall (or correct classification rate) is the percentage of a certain class correctly identified. Thus, recall is the number of true positives out of the sum of true positives and false negatives for a class, as follows where tp is true positives and fn is false negatives:

$$\frac{tp}{tp + fn} \qquad (6)$$

The method may include using the true class of the selection of the unlabeled input dataset (which is unknown to the machine learning model) and the prediction scores as inputs to calculate precision and recall for the trained machine learning model.

As discussed more below, improving precision often reduces recall. Likewise, improving recall often reduces precision. Thus, it can be difficult to strike a balance between the two. The disclosed method may include calculating a threshold value for prediction scores that optimizes both precision and recall for classification. It is understood that optimizing both precision and recall may require the reduction of one or both of precision and recall to strike a balance between precision and recall.

The method may include calculating the optimal thresholds for prediction scores by calculating which possible thresholds optimize recall and precision for predictions. For example, the method may include calculating the optimal thresholds for classifications of intents of unknown input text by calculating which possible thresholds optimize recall and precision for predictions. The determined optimal thresholds may be used by the machine learning model to determine classifications based on prediction scores (e.g., probabilities output by the machine learning model). As previously mentioned, to find optimal threshold values, the method may include performing multi-objective optimization to optimize both recall and precision. For example, in some embodiments, a threshold optimization module may perform Non-dominated Sorting Genetic Algorithm II (NSGA-II) which is a multi-objective genetic algorithm described in Kalyanmoy Deb, Amrit Pratap, Sameer Agarwal, and TAMT Meyarivan. 2002. "A fast and elitist multiobjective genetic algorithm: NSGA-II." IEEE transactions on evolutionary computation, 6(2):182-197, which is incorporated by reference in its entirety. NSGA-II performs well at finding optimal process parameters in various machining operations where two performance indicators for the process parameters are in tension with one another. In the context of this specification, NSGA-II may be applied to find optimal thresholds for prediction scores output by a machine learning model. For example, NSGA-II may be applied to find optimal thresholds for determining classes of intents based on prediction scores output by an intent classifier.

The trained model (e.g., intent classifier) may process a plurality of input utterances to calculate prediction scores for the plurality of input utterances that are unknown to the trained model. While the true class for the training data samples may be unknown by the trained classifier, the true class of the training data samples may be known by the optimization module. Thus, for each threshold in a selection of thresholds, the optimization module can compare the true class to the class predicted by the trained classifier. The class predicted by the trained classifier may be determined by comparing the prediction score to a threshold and determining that the prediction score has a value equal to or greater than the threshold for that class. In other words, the predicted class may be based upon whether a prediction score has a value equal to or greater than a possible threshold.

The optimization module may calculate recall and precision for different thresholds applied to a sample of prediction scores for the same class. Different thresholds can yield different results for the same prediction score. For example, if a prediction score for an input utterance of "where is the agent" in an intent classifier may be 0.81 for the intent class of "speak to agent", the utterance may be classified as the intent class of "speak to agent" if the threshold for such an intent class is 0.60 or 0.70. However, the input utterance may not be classified as having this intent if the threshold for the intent class is 0.85. Accordingly, whether the prediction score of 0.81 places an input utterance in an intent class is dependent upon the threshold value used. If the optimization module knows that the true class of the input utterance of "where is the agent" is the intent class of "speak to agent", then the optimization module can determine whether the use of a particular threshold has resulted in a true positive, false positive, true negative, or false negative. These determinations may be inserted in equations to calculate precision and recall for a selection of thresholds for the same user utterance/same prediction score.

More than one utterance of the input utterances with intents unknown to the trained model may have the same true class. For example, the input text of "where is the agent?" and the input text of "can you get someone on here?" could both be unknown to the trained model and may both have the true intent class of "speak to agent." The trained model may generate a prediction score of 0.73 for the true intent class of the input text of "where is the agent?" The trained model may generate a prediction score of 0.62 for the true intent class of the input text of "can you get someone on here." As discussed above, the threshold used for comparison determines whether or not an utterance falls into a particular class. For example, the threshold of 0.70 for the intent class of "speak to agent" would land the input text of "where is the agent" (having a prediction score of 0.73) in its true class and would yield a false negative for the input text of "can you get someone on here" (having a prediction score of 0.62). The optimization module may calculate recall and precision for different thresholds applied for the intent class of "where is the agent." Both of these calculations may use the number of true positives for the intent class as input.

The recall may be calculated also using the number of false positives generated using a specific threshold. Precision may be calculated using also the number of overall positives generated using a specific threshold. The optimization module may then apply the calculated recall and precision for each threshold to calculate an optimal threshold for the intent class of "where is the agent?"

Once the optimal thresholds are calculated, these thresholds may be used to further train a machine learning model to apply the optimal thresholds to make determinations based on prediction scores (e.g., probabilities output by the machine learning model). For example, in the example in which the machine learning model is an intent classifier, the optimal thresholds may be used to train the intent classifier of a virtual agent to identify a user's intent from a conversation. If an input into the intent classifier has prediction scores for each intent class that are lower than the optimal thresholds for each respective class, then the input can be classified as an unknown intent class.

As previously mentioned, in some embodiments, the optimal thresholds may be obtained by multi-objective optimization (e.g., performing operations 512). In some embodiments, multi-objective optimization may include NSGA-II. NSGA-II may include the use of genetic operators (i.e., crossover and mutation), as well as two specialized multi-objective operators/mechanisms, which include non-dominated sorting and crowd distancing. In non-dominated sorting, the population may be sorted and partitioned into fronts. For example, the fronts may be identified as F1, F2, etc., where F1 is the first front, indicating the approximated Pareto front. Crowding distance is a mechanism of ranking among members of a front, which are dominating or dominated by each other.

As previously mentioned, the method may include optimizing two objective values: recall (or correct classification rate) and precision of the known classes. The method may include taking threshold values of a class as the input variable (e.g., values ranging from 0.1 to 0.99). Then, the prediction scores of samples from the trained base model may be used to perform optimization on the two objective functions of recall (or correct classification rate) and precision of known classes to get an optimal threshold for each known class.

As discussed above, the method may include randomly selecting multiple threshold values from a range of threshold values for prediction scores for each known class and initializing a population with the randomly selected threshold values (e.g., performing operations 506 and 508). The initial population can be considered the parent population.

A non-dominated sorting may be performed in the combination of parent and offspring populations. These parent and offspring populations may be classified by fronts, i.e., these are sorted in an ascending level of non-domination to determine fronts. Next, a new population may be filled according to front ranking. If one front is taken partially, crowding-sort may be performed. The less dense population may be preferred. The offspring population (children) may then be created from this new population using crowded tournament selection, which compares by front ranking, or if equal, then by crowding distance. Creating the offspring population may also include crossover and mutation operators. The most important solutions (i.e., the best entries) of the population are kept in fronts. The same procedure may be run multiple (e.g., 1000) times to get a set of optimal thresholds for each known class (e.g., intent class). From this set of thresholds, the maximum threshold can be selected as the optimal threshold to be used to decide upon known and unknown samples (e.g., intent samples).

In normal thresholding, as in other embodiments, input containing training data samples (i.e., the unlabeled dataset) is fed to the machine learning model to get the prediction scores corresponding to each class the machine learning model is trained for. These prediction scores (PS) and the list of thresholds (T) ranging from 0.1 to 0.9 increasing by 0.1 in each step may be used to calculate the correct classification matrix (CCM) and the misclassification matrix (MCM).

The set of prediction scores is a matrix of N×M where N is the total number of training samples and M is the number of known classes (e.g., intent classes). This set of prediction scores and the list of thresholds containing K threshold values may be used to calculate CCM and MCM.

For the following equation, $C(X)$ is the output class, Y is the ground truth class, and $(\cdot)$ is the enumeration function, the standard definition for correctly classified sample (or true positives) rate of a class i is given in Equation 7:

$$CC_i = \frac{(C(X) = i \text{ AND } Y = i)}{Y = i} \tag{7}$$

The standard definition of misclassified sample rate (or false negatives) of a class i as given by Equation 8 may be written as:

$$MC_i = \frac{(C(X) \neq i \text{ AND } Y = i)}{Y = i} \tag{8}$$

The correct classification rate (CC) and misclassification (MC) rate of a class i can be extended by introducing the thresholds $\tau_i$ and by adding the unsure classification (UC) rate, for each class as shown in the following equations:

$$CC_i(\tau_i) = \frac{(C(X) = i \text{ AND } S(X) > \tau_i)\text{AND}(Y = i)}{Y = i} \tag{9}$$

$$MC_i(\tau_i) = \frac{(X) \neq i \text{ AND}(S(X) > \tau_i)\text{AND}(Y = i)}{Y = i} \tag{10}$$

$$UC_i(\tau_i) = \frac{(C(X) = i)\text{or}(C(X) \neq i)\text{AND } S(X) < \tau_i)\text{AND}(Y = i)}{Y = i} \tag{11}$$

For each class, the following can be calculated:

$$CC_i(\tau_i) + MC_i(\tau_i) + UC_i(\tau_i) = 1 \tag{12}$$

CCM is a matrix of K×M dimension containing the correct classification rate of each class corresponding to each threshold in the threshold list, i.e., each entry $CC_{ij}$ is calculated using equation 13.

$$CC_{ij} = \sum_{i=1}^{N} \frac{(C(X) = i \text{ AND}(S(X) > \tau_i)\text{AND } Y = i)}{Y = i} \tag{13}$$

MCM is a matrix of K×M dimension containing the misclassification rate of each class corresponding to each threshold in the threshold list, i.e., each entry $MC_{ij}$ is calculated using equation 14.

$$MC_{ij} = \sum_{i=1}^{N} \frac{(C(X) \neq i \text{ AND}(S(X) > \tau_i)\text{AND}(Y = i)}{Y = i} \tag{14}$$

After obtaining these two matrices, the optimal thresholds $\tau_i$ may be obtained for each known class by keeping the best correct classification rate while reducing the misclassification rate. To do so, the threshold(s) $\tau$ that maximizes $CC_i(\tau)$ can be determined. Since several thresholds could reach this maximum, a set of threshold(s) $Seg_1$ may be obtained. Then, the threshold with the lower $MC_i(\tau)$ can be selected as the optimal threshold to be used to decide upon known and unknown samples (e.g., intent samples). This can be mathematically written as:

$$s=\mathrm{argmax}_{\tau}CC_i(\tau) \quad (15)$$

$$\tau_i=\mathrm{argmax}_{\tau'\in S}MC_i(\tau') \quad (16)$$

The method may include further training the machine learning model to classify input using the determined optimal threshold values that were determined through multi-objective optimization or normal thresholding. For example, method 500 includes further training the machine learning model to classify the intent of a user utterance by applying the determined optimal threshold values (operation 514). Training the machine learning model to classify input using the determined optimal threshold values that were determined through multi-objective optimization or normal thresholding may include training the machine learning model to classify an input as "unknown" if the prediction scores for each known class are below the determined optimal threshold values for all of the known classes. In other words, training the machine learning model to classify based on the optimal threshold values automatically trains the machine learning model to detect "unknown" classes.

In some embodiments, when a new sample (unseen or unknown class) is encountered it may first be fed to the base model (e.g., Bi-LSTM or BERT) to get the corresponding prediction scores. The prediction scores of each of the entries can be compared to the prediction scores with the corresponding optimal thresholds and if all the entries are found to be less than the corresponding optimal thresholds that sample can be classified as unknown, otherwise the sample is classified to the one known class for which the prediction score is higher than the corresponding optimal threshold. In other words, if an input is processed by the machine learning model and the resulting prediction scores for each known class are below the determined optimal thresholds for each class, the input is classified as "unknown."

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A computer-implemented method of training and refining a machine learning model, comprising:

generating an intent classification deep neural network by training a machine learning model with a labeled dataset including labels defining which classes apply to each piece of data;

inputting an unlabeled dataset with unknown classes into the initially trained machine learning model to generate prediction scores representing the probability that each piece of data belongs in each known class, respectively;

randomly selecting multiple threshold values from a range of threshold values for prediction scores for each known class;

for each known class, initializing a population with the randomly selected threshold values;

calculating objective values of recall and precision for each of the randomly selected threshold values;

performing multi-objective optimization to determine which threshold values of the randomly selected threshold values optimize both recall and precision for each known class; and generating a finally trained machine learning model by training the intent classification deep neural network to classify input using the determined optimal threshold values.

2. The method of claim 1, wherein performing multi-objective optimization comprises performing Non-dominated Sorting Genetic Algorithm II (NSGA-II) to determine which threshold values of the randomly selected threshold values optimize both recall and precision for each class the initially trained machine learning model is trained for.

3. The method of claim 1, wherein performing multi-objective optimization comprises sorting the initialized population into fronts ranked by ascending level of non-domination, wherein the fronts each contain members including threshold values of the randomly selected threshold values.

4. The method of claim 3, wherein performing multi-objective optimization comprises, for each front, calculating a crowding distance for each member of the respective front.

5. The method of claim 4, wherein performing multi-objective optimization comprises generating an offspring population by applying crowded tournament selection to the members of the fronts.

6. The method of claim 5, wherein crowded tournament selection includes comparing the rank between two members and, if one member has a higher rank than the other member, selecting the member with the higher rank, and, if two members have the same rank, selecting the member with the highest crowding distance.

7. The method of claim 5, wherein generating the offspring population includes applying crossover and mutation operators to the initialized population.

8. A non-transitory computer-readable medium storing software comprising instructions executable by one or more computers which, upon such execution, cause the one or more computers to:

generate an intent classification deep neural network by training a machine learning model with a labeled dataset including labels defining which classes apply to each piece of data;

input an unlabeled dataset with unknown classes into the initially trained machine learning model to generate prediction scores representing the probability that each piece of data belongs in each known class, respectively;

randomly select multiple threshold values from a range of threshold values for prediction scores for each known class;

for each known class, initialize a population with the randomly selected threshold values;

calculate objective values of recall and precision for each of the randomly selected threshold values;

perform multi-objective optimization to determine which threshold values of the randomly selected threshold values optimize both recall and precision for each known class; and generate a finally trained machine learning model by training the intent classification deep neural network to classify input using the determined optimal threshold values.

9. The non-transitory computer-readable medium storing software of claim 8, performing multi-objective optimization comprises performing Non-dominated Sorting Genetic Algorithm II (NSGA-II) to determine which threshold values of the randomly selected threshold values optimize both recall and precision for each class the initially trained machine learning model is trained for.

10. The non-transitory computer-readable medium storing software of claim 8, wherein performing multi-objective optimization comprises sorting the initialized population into fronts ranked by ascending level of non-domination, wherein the fronts each contain members including threshold values of the randomly selected threshold values.

11. The non-transitory computer-readable medium storing software of claim 10, wherein performing multi-objective optimization comprises, for each front, calculating a crowding distance for each member of the respective front.

12. The non-transitory computer-readable medium storing software of claim 11, wherein performing multi-objective optimization comprises generating an offspring population by applying crowded tournament selection to the members of the fronts.

13. The non-transitory computer-readable medium storing software of claim 12, wherein crowded tournament selection includes comparing the rank between two members and, if one member has a higher rank than the other member, selecting the member with the higher rank, and, if two members have the same rank, selecting the member with the highest crowding distance.

14. The non-transitory computer-readable medium storing software of claim 13, wherein generating the offspring population includes applying crossover and mutation operators to the initialized population.

15. A system for training and refining a machine learning model, the system comprising:

a device processor; and a non-transitory computer readable medium storing instructions that are executable by the device processor to:

generate an intent classification deep neural network by training a machine learning model with a labeled dataset including labels defining which classes apply to each piece of data;

input an unlabeled dataset with unknown classes into the initially trained machine learning model to generate prediction scores representing the probability that each piece of data belongs in each known class, respectively;

randomly select multiple threshold values from a range of threshold values for prediction scores for each known class;

for each known class, initialize a population with the randomly selected threshold values;

calculate objective values of recall and precision for each of the randomly selected threshold values;

perform multi-objective optimization to determine which threshold values of the randomly selected threshold values optimize both recall and precision for each known class; and generate a finally trained machine learning model by training the intent classification deep neural network to classify input using the determined optimal threshold values.

16. The system of claim 15, performing multi-objective optimization comprises performing Non-dominated Sorting Genetic Algorithm II (NSGA-II) to determine which threshold values of the randomly selected threshold values optimize both recall and precision for each class the initially trained machine learning model is trained for.

17. The system of claim 16, wherein performing multi-objective optimization comprises sorting the initialized population into fronts ranked by ascending level of non-domination, wherein the fronts each contain members including threshold values of the randomly selected threshold values.

* * * * *